(No Model.)

G. & E. D. ASHLEY.
MEAT CUTTER.

No. 527,921. Patented Oct. 23, 1894.

Witnesses:
J. L. Edwards, Jr.
Fred. J. Dole.

Inventors:
George Ashley.
Edward D. Ashley,
By their Attorney,
F. H. Richards

UNITED STATES PATENT OFFICE.

GEORGE ASHLEY AND EDWARD D. ASHLEY, OF NEW BRITAIN, CONNECTICUT.

MEAT-CUTTER.

SPECIFICATION forming part of Letters Patent No. 527,921, dated October 23, 1894.

Application filed May 19, 1894. Serial No. 511,776. (No model.)

*To all whom it may concern:*

Be it known that we, GEORGE ASHLEY and EDWARD D. ASHLEY, citizens of the United States, residing at New Britain, in the county of Hartford and State of Connecticut, have invented certain new and useful Improvements in Meat-Cutters, of which the following is a specification.

This invention relates to that class of meat-cutters employing feed-screws or revoluble cutters having spirally-disposed cutting-flanges; the object of the present invention being to provide a simple and effective means, of improved construction and organization, adapted for cutting meat, and whereby the meat being cut will not have a continuous spiral-feed movement toward the delivering-end of the cutting-chamber of the machine, as in machines of ordinary construction, but will be subjected to a rolling movement in the plane of the axis of the cutter so as to present different portions thereof successively to the action of the cutter, and whereby the meat will be fed gradually forward in a zigzag course,—that is to say, the meat being cut will first be carried forward a definite distance, after which the direct forward movement thereof will be interrupted and the meat will then be carried backward a relatively short distance as compared with the forward movement thereof, which will gradually, during the continuation of these movements, carry the meat toward the discharge-end of the cutting-chamber.

Figure 1:
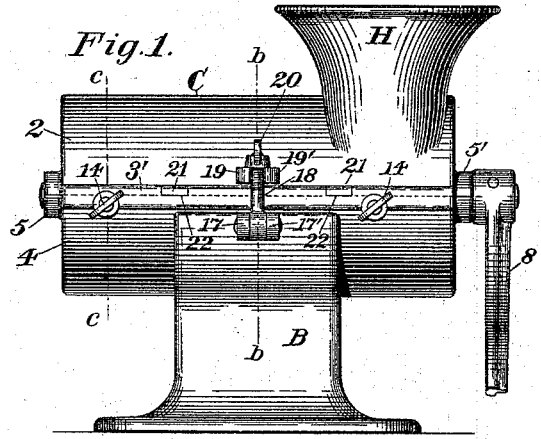
Figure 2:
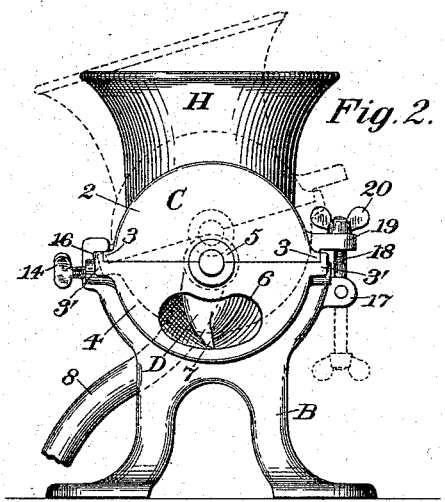
Figure 3:
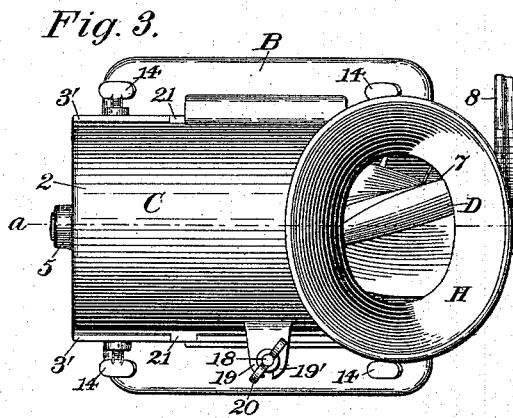
Figure 5:
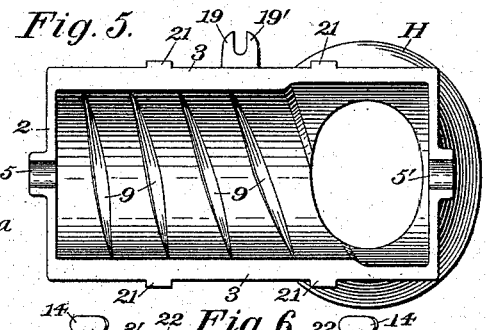
Figure 4:
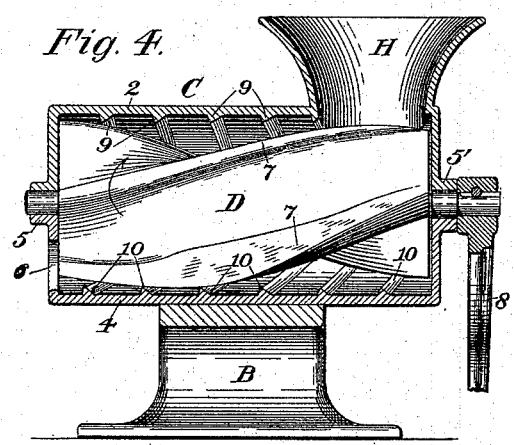
Figure 6:
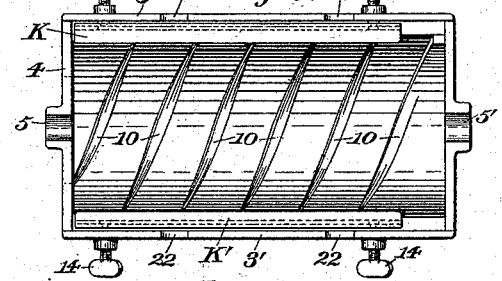
Figures 7, 8:
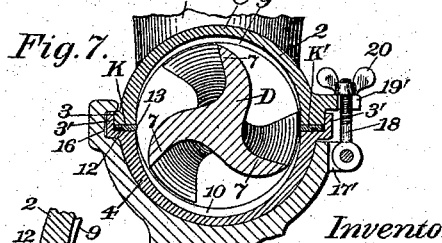

In the drawings accompanying and forming a part of this specification, Figure 1 is a side-elevation of a meat-cutter embodying my invention. Fig. 2 is an end view of the same, the dotted lines therein showing the manner of removing or applying the casing from and to the base or standard. Fig. 3 is a plan view of the machine. Fig. 4 is a vertical longitudinal section of the same, taken in line $a—a$, Fig. 3. Fig. 5 is an inverted view of the upper half of the casing, showing the spirally-disposed ribs for interrupting the continuous forward movement of the material being cut. Fig. 6 is a plan view of the lower half of the casing, showing the adjustable cutter-bars at the sides thereof. Fig. 7 is a transverse section of a portion of the machine, taken in line $b—b$, Fig. 1, looking toward the right-hand in said figure, and illustrating the manner of assembling the parts. Fig. 8 is an enlarged sectional view of a portion of the casing, taken in line $c—c$, Fig. 1, and showing the means of adjusting the cutter-bar.

Similar characters designate like parts in all the figures.

The present invention resides in a meat-cutter comprising a two-part, or longitudinally-divided, case, or cylinder, each part of which has a plurality of remotely-disposed internally-projecting semi-annular or partially-spiral flanges or ribs, (the flanges of one part being so disposed with relation to those of the other part as to form, when the two parts of the case are secured together, a plurality of substantially annular inclined flanges or ribs;) a spirally-flanged cutter, or feed-screw, supported for rotation in said case with its spiral flanges inclined in a direction coinciding with the direction of one set only of the flanges of the case, means for rotating said cutter, and a longitudinally-disposed cutting-blade secured at one side of the case with the cutting-edge thereof adjacent to the path of movement of the cutting-edges of the cutter, as will be hereinafter more fully described. In the form thereof herein shown, the case C, which constitutes the cutting-chamber, and which will, in practice, be of tubular form, consists of two semi-circular cylindrical parts, 2 and 4, they being divided horizontally and longitudinally, as shown most clearly in Figs. 2 and 7, and having interlocking flanges, 3 and 3', at opposite sides thereof, said casing being supported by a suitable base, B, to which it will preferably be removably secured, as hereinafter more fully described. At the forward end of the casing C is a hopper, H, which may be formed, as herein shown, integral with the upper part, 2, of said casing, said hopper communicating with the interior of the casing in the usual manner; a discharge-opening, 6, being formed in the opposite rear end of the casing, through which the meat may be discharged after cutting.

Journaled in bearings, 5—5', at opposite ends of the case C, is a revoluble cutter, D, which, as herein shown, is of spiral form, it having a series of spirally-disposed cutting-flanges, 7, preferably three in number, and being adapted for imparting an advancing movement to the meat, and for cutting the same, as will be hereinafter more fully described. This spiral cutter will be rotated in the direction designated by the arrow in Fig. 4, and will be usually provided with a crank, 8, at one end thereof, by means of which the same may be rotated.

Formed upon the interior of the two parts, 2 and 4, of the case C are a plurality of sets of oppositely running laterally-projecting inclined flanges, 9 and 10, respectively, disposed upon intersecting lines, and which, in consequence of their peculiar functions, will be herein termed the "hold-back" or retracting flanges, and the feeding-ribs, respectively. The flanges, 10, formed upon the lower part 4, of the case, will be inclined to coincide with the feeding-direction of the spiral cutter D, and will tend, during the rotation of said cutter, to co-act with the cutter and assist the advancing movement of the meat being cut, although said flanges will be of such pitch with relation to the pitch of the cutting-flanges of the cutter as to slightly retard the otherwise rapid advancing movement of the meat; while the flanges or ribs, 9, upon the upper part, 2, of the case C are reversely inclined with relation to the feeding-direction of the spiral cutter, and will, during the rotation of the cutter, act in direct opposition to the feeding movement of the meat, and will tend, during the continued operation of the machine, as the meat is revolved by the cutter, to carry said meat backward toward the receiving-end of the case. These flanges will, in practice, be concentric to the axis and cutting-edges of the feed-screw or cutter, and will co-act with said cutting-flanges to shear or cut the meat.

In practice the degree of inclination, or angle, of the several upper hold-back flanges will be gradually reduced toward the discharge-end of the casing, so that the flanges adjacent to said discharge-end will exert a resistance of less force than those at the receiving-end of said casing, to thereby relieve the resistance to, and facilitate, the discharge of the meat when it reaches this end of the case.

By the provision of hold-back and feeding flanges or ribs as just described, it will be seen that the meat during the process of cutting is subjected to a peculiar action; i. e., the meat, fed to the cutting-chamber through the hopper, is first carried forward with a spiral movement a short distance by the spiral cutter, and is assisted in this advancing movement by the feeding-flanges of the lower part, 4, of the case C; after which it is carried around by the spiral cutter, which brings it in contact with the forward edges of the upper retarding-flanges or ribs, 9, which, owing to their peculiar disposition, tend to impart a retractive movement to the meat, carrying the same backward a short distance during the continued rotation of the cutter, until the meat again comes in proximity to the lower flanges 10, when it is rolled over in a direction transverse to said flanges and carried forward over the next succeeding flange of the lower series, 10, by the action of the spiral cutter, thence forward and upward to the next succeeding flange-spaces between the flanges, 9, of the upper part of the case C. The inner edges of both sets of flanges, 9 and 10, co-act with the cutting-edges of the spiral cutter to shear the meat, and, owing to their peculiar disposition with relation to adjacent sides of the cutter, the meat, during the operation of cutting, will be gradually fed forward in a zigzag course and subjected to a rotary movement both in the direction of rotation of the cutter and also longitudinally thereof, thus continually presenting different portions of the meat to the action of the cutting-flanges, thus preventing crowding or jamming, and securing the best practical results.

The "hold-back" or retracting flanges 9, and the feed-flanges 10, will, in practice, be so constructed and disposed with relation to each other, and with relation to the feed-screw or spiral cutter, that during the cutting operation the advancing movement of the meat or material being cut, which advancing movement is effected by the co-action of the spiral cutter and feed-flanges 10, will be in excess of the retractive movement effected by the co-action of said cutter and the retractive or hold-back flanges 9. Thus it will be seen that while the material being cut has an interrupted, or advancing and retracting, movement, it will be gradually fed toward the discharge-end of the case and will be constantly shifted in position, thus presenting various portions thereof successively to the action of the cutters.

As a means for shearing or cutting the meat in a line transverse to the peripheral line of the flanges 9 and 10 and in a plane coinciding with the axis of the spiral cutter, two cutter-bars or knives, K and K', are provided, which, as herein shown, are oppositely disposed and are adjustably secured in parallelism, one to each side of the casing with its cutting-edge adjacent to the path of travel of the cutting-edges of the feed-screw or spiral cutter D. In the form thereof herein shown, these side-knives or cutter-bars K and K' are oblong flat plates grooved longitudinally at one side, as shown at 12, and tapered or inclined transversely at one edge, as shown at 13, to form the cutting-edge thereof. These cutter-bars are herein shown supported for shifting movement, transversely, between the two edges of the two parts, 2 and 4, of the case C. As a convenient means for adjusting said cutter-bars, adjusting-screws, 14, are provided, which are seated in screw-threaded openings formed in the lower part, 4, of the case, and which are pheripherally grooved near their inner ends to form annular flanges, 15, which flanges are seated in the longitudinal grooves, 12, of said cutter-bars, said cutter-bars being adapted to be moved toward or from the cutting-flanges of the spiral cutter D upon the rotation of the adjusting-screws 14, there being preferably two adjusting-screws from each cutter-bar, located one at each end thereof. These cutter-bars are adapted, in connection with the cutting-flanges of the feed-screw or spiral cutter, to shear the meat or other material as it is carried around by and between the flanges of said spiral-cutter, and act upon said material substantially at right angles to the direction of rotary movement imparted to said material by the rotation of the cutter D.

By the construction and organization herein described, a relatively small quantity of meat, as compared with the capacity of the cutting-chamber or case, may be as effectively cut and fed through the cutting-chamber, thereby obviating the necessity of packing or completely filling the case to secure the requisite advancing movement of the material, as is usually necessary in machines of this class of ordinary construction; and consequently, owing to the relief afforded by non-crowding or packing, I am enabled to cut the maximum amount of material at the minimum expense of power, and with a resultant saving in the wear of the working parts of the machine.

For convenience in assembling and disassembling the parts, the two parts, 2 and 4, of the case may be laterally flanged, as shown at 3 and 3', at both sides thereof, the flanges 3' of the part 4 being L-shaped and overlapping the outer edge of the flanges 3 of the part 2; and as a means for removably securing the case C to the base B, the upper edge of the base B is grooved longitudinally at one side thereof, as shown at 16, to form a hinge-like bearing for the flanges at one side of the case C, as most clearly shown in Figs. 2 and 7 of the drawings, while the opposite side of the base B is provided at its upper edge, approximately central with relation to the length of the case, with two laterally-projecting ears, 17 and 17', between which is pivoted a stud or clamp-screw, 18, the upper end or shank of which is adapted to extend between lugs, 19 and 19', formed upon the upper part, 2, of the case C, when the parts are assembled; said case being clamped, when applied to the base B, in the position shown in full lines in Figs. 1, 2 and 3, by means of a thumb-nut, 20, screwed upon the end of the stud 18 and bearing against the upper faces of the lugs 19 and 19'. This forms a convenient clamping-device for removably securing the casing to the base, and enables the same to be quickly removed and replaced, and dispenses with detachable parts, such as screws, bolts, &c.

To prevent accidental longitudinal movement of the two parts of the casing with relation to each other, one of said parts will be provided at its outer edge, at opposite sides, with projections or holding-lugs, 21, adapted to enter recesses, 22, formed in the adjacent edges of the other part of the case.

Having thus described our invention, we claim—

1. A meat-cutter comprising a casing having a plurality of remotely-disposed, internally-projecting and substantially annular flanges, and a spiral-formed cutter supported for rotation within said case with its cutting-edges adjacent to said flanges, substantially as described and for the purpose set forth.

2. A meat-cutter comprising a centrally and longitudinally divided two-part tubular casing, each part of which has a series of remotely-disposed internally-projecting flanges, the flanges of one part being inclined in opposition to those of the other part, and a spiral cutter supported for rotation in said casing and having cutting-edges inclined in the direction of one of the series of flanges, substantially as described and for the purpose set forth.

3. In a meat-cutter, the combination with a casing and with a revoluble spirally-flanged cutter supported for rotation therein; of two sets of internal flanges carried by said casing, the flanges of one set being positioned and adapted for co-acting with the flanges of the cutter to impart an advancing movement to the material being cut, and the flanges of the other set being oppositely disposed upon lines intersecting the lines of direction of the flanges of the first-mentioned set and being adapted for imparting a positive retractive movement to said material, substantially as described.

4. In a meat-cutter, the combination with a casing and with a revoluble spiral cutter supported therein, of oppositely-disposed retracting and advancing internal flanges carried by said casing and disposed upon intersecting lines and adapted in connection with the cutter for cutting the material and for imparting a zigzag advancing movement thereto, substantially as described.

5. In a meat-cutter, a casing having a plurality of pairs of internal flanges the flanges of each pair being arranged on lines intersecting the other, in combination with a revoluble cutter having spiral cutting-edges adjacent to and adapted for co-acting with said flanges for cutting and feeding the material being operated upon, substantially as described.

6. A meat-cutter comprising a casing having a plurality of independent annular internally-projecting flanges set obliquely to the axis of the cutter, and a cutter supported for rotation within said case and having its cutting-edges adjacent to the oblique flanges of the casing, substantially as described and for the purpose set forth.

7. In a meat-cutter, a casing having series of remotely- and transversely-disposed internal flanges, the flanges of one series having gradually-reduced degrees of inclination, in combination with a spirally-flanged cutter supported for rotation in said casing and having its flanges inclined oppositely to said flanges of gradually-reduced degrees of inclination, substantially as described and for the purpose set forth.

8. In a meat-cutter, in combination, a tubular casing having two separate sets of internally-projecting inclined and remotely-disposed flanges, the flanges of one set of which have different degrees of inclination relative to each other and are adapted for retarding the movement of the material being operated upon, with decreasing force, and the flanges of the other set of which are adapted for advancing the movement of the material, and a co-acting cutter having spiral cutting-edges and supported for rotation in said casing with its cutting-edges inclined in the direction of inclination of one of the sets of flanges, substantially as described and for the purpose set forth.

9. In a meat-cutter, the combination with the internally-flanged casing, and with the spirally-flanged revoluble cutter supported therein, of a longitudinally-grooved cutter-bar, and an adjusting-screw revolubly supported in the casing and having a flange engaging in the groove of the cutter-bar, substantially as described and for the purpose set forth.

GEORGE ASHLEY.
EDWARD D. ASHLEY.

Witnesses:
FRED. J. DOLE,
FREDERICK A. BOLAND.